United States Patent
Fujii et al.

(10) Patent No.: US 7,612,480 B2
(45) Date of Patent: Nov. 3, 2009

(54) INTERIOR PERMANENT MAGNET MOTOR

(75) Inventors: Yoshio Fujii, Kyoto (JP); Hideaki Suzuki, Kyoto (JP)

(73) Assignee: Nidec Corporation, Kyoto (JP)

( * ) Notice: Subject to any disclaimer, the term of this patent is extended or adjusted under 35 U.S.C. 154(b) by 40 days.

(21) Appl. No.: 11/954,486

(22) Filed: Dec. 12, 2007

(65) Prior Publication Data
US 2008/0136281 A1    Jun. 12, 2008

(30) Foreign Application Priority Data
Dec. 12, 2006    (JP) .............................. 2006-334201

(51) Int. Cl.
*H02K 21/12* (2006.01)
(52) U.S. Cl. .............................. 310/156.53; 310/156.56
(58) Field of Classification Search ............ 310/156.53, 310/156.56, 156.57, 156.08
See application file for complete search history.

(56) References Cited

U.S. PATENT DOCUMENTS

| | | | | |
|---|---|---|---|---|
| 5,962,944 A | * | 10/1999 | Narita et al. ........... | 310/156.53 |
| 6,031,311 A | * | 2/2000 | Lee ........................ | 310/156.57 |
| 6,794,784 B2 | * | 9/2004 | Takahashi et al. ....... | 310/156.56 |
| 6,946,766 B2 | * | 9/2005 | Gary et al. ............. | 310/156.53 |
| 2007/0063607 A1 | * | 3/2007 | Hattori ................... | 310/156.53 |

FOREIGN PATENT DOCUMENTS

| | | |
|---|---|---|
| JP | 2000-060038 A | 2/2000 |
| JP | 2005-328679 A | 11/2005 |

* cited by examiner

*Primary Examiner*—Michael C Zarroli
(74) *Attorney, Agent, or Firm*—Keating & Bennett, LLP (57) ABSTRACT

A rotor portion of a motor includes a rotor core and a plurality of field magnets arranged in a circumferential direction at the rotor core. The rotor core includes at a flux barrier portion thereof arranged between a pair of field magnets of opposite magnetic polarities arranged next to one another a flux barrier hole. The flux barrier hole is independent of a magnet retaining hole in which the field magnet is retained. The magnet retaining hole includes a concave portion extending from a side thereof nearest to the flux barrier hole toward the corresponding flux barrier hole.

20 Claims, 8 Drawing Sheets

INTERIOR PERMANENT MAGNET MOTOR

BACKGROUND OF THE INVENTION

1. Field of the Invention

The present invention relates to a motor.

2. Description of the Related Art

In recent years, various components and mechanisms used in a motor vehicle have been developed with specific focus on environmental concerns (e.g., energy efficiency, reduction of carbon dioxide emission, and the like). One of such mechanisms is an "idling stop" mechanism which allows an engine of the vehicle not in motion to stop automatically in order to reduce the carbon dioxide emission.

However, when a compressor is activated by the engine of such vehicle, each time the engine stops, the components activated by the compressor, such as an air conditioner, also stop. In order to prevent such inconvenience, the compressor of the components, such as an air conditioner, is operated by a motor (e.g., IPM (Interior Permanent Magnet)). That is, the compressor is activated by a car battery, which allows the air conditioner or the like to continue to operate even when the engine is not running.

However, a conventional IPM motor has a problem in that magnetic flux leakage may likely to occur via the rotor core thereof at a portion between permanent magnets of opposite magnetic polarity which consequently decreases the efficiency of the motor.

Also, although durability of the rotor core of the IPM motor is a critical issue since a great deal of centrifugal force is applied thereto particularly at the portion in between the permanent magnets, the conventional configuration of the IPM motor including a hollow portion at the rotor core may not fully support such force.

SUMMARY OF THE INVENTION

In order to overcome the problems described above, preferred embodiments of the present invention provide a motor having a rotor portion rotating about a central axis. The rotor portion includes a shaft arranged concentrically with the central axis, a magnetic rotor core having a substantially cylindrical shape arranged attached to the shaft, a plurality of field magnets arranged at an outer circumferential surface of the rotor core facing the central axis, and each extending in a direction parallel or substantially parallel to the central axis. The rotor core includes a plurality of magnet retaining holes accommodating therein the field magnets, and a plurality of flux barrier holes arranged in the direction parallel or substantially parallel to the central axis at a space between a pair of field magnets each having a magnetic polarity that is different from one another. Each flux barrier hole is arranged independently of a pair of magnet retaining holes each accommodating therein the corresponding field magnet. Each magnet retaining hole includes a concave portion extending toward the corresponding flux barrier hole.

Also, a flux barrier hole may include a reinforcement portion having a lower magnetic permeability than that of the rotor core.

Other features, elements, steps, characteristics and advantages of the present invention will become more apparent from the following detailed description of the preferred embodiments thereof with reference to the attached drawings.

DETAILED DESCRIPTION OF PREFERRED EMBODIMENTS

Note that in the description of preferred embodiments of the present invention herein, words such as upper, lower, left, right, upward, downward, top and bottom for describing positional relationships between respective members and directions merely indicate positional relationships and directions of the drawings. Such words do not indicate positional relationships and directions of the members mounted in an actual device. Also note that reference numerals, figure numbers and supplementary descriptions are shown below for assisting the reader in finding corresponding components in the description of the preferred embodiments below to facilitate the understanding of the present invention. It is understood that these expressions in no way restrict the scope of the present invention.

Figure 1:
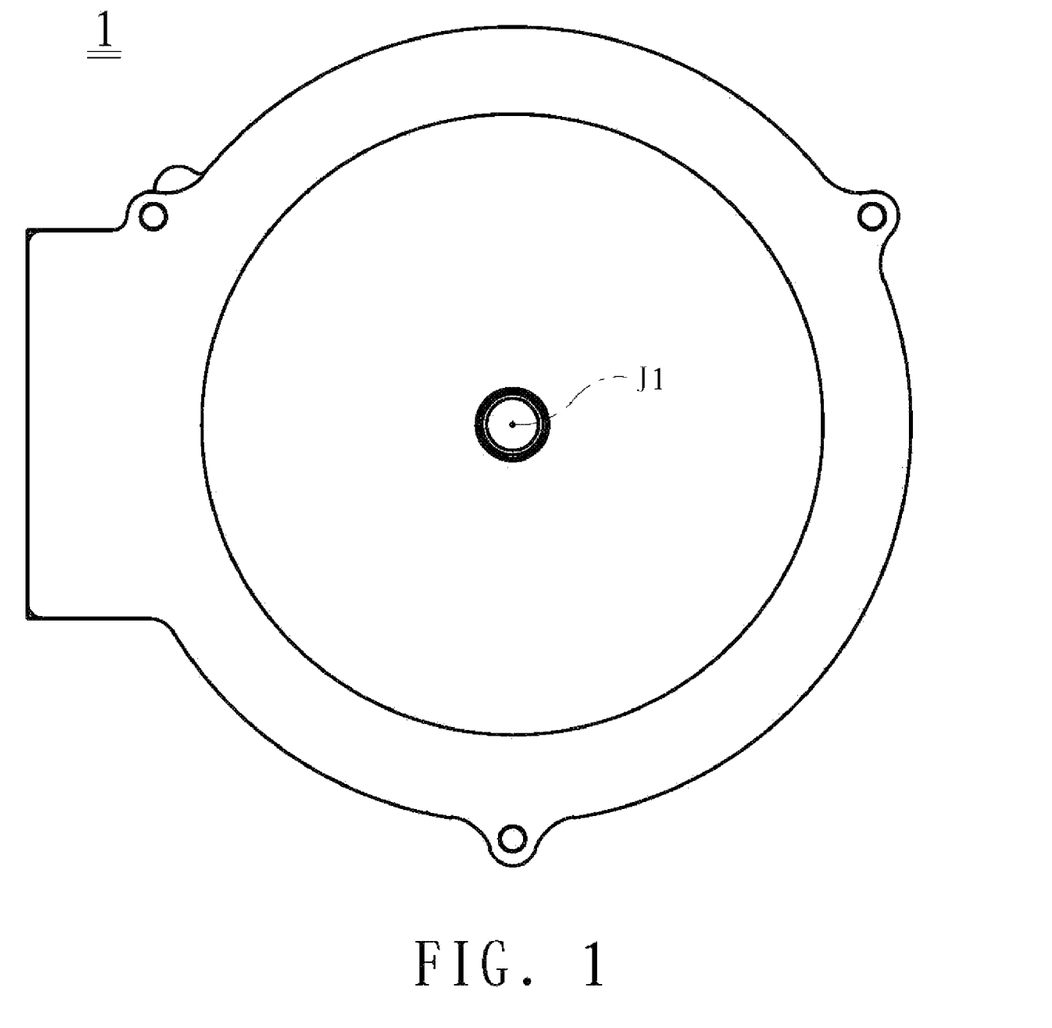
FIG. 1 is a schematic plan view of a motor according to a first preferred embodiment of the present invention.
Figure 2:
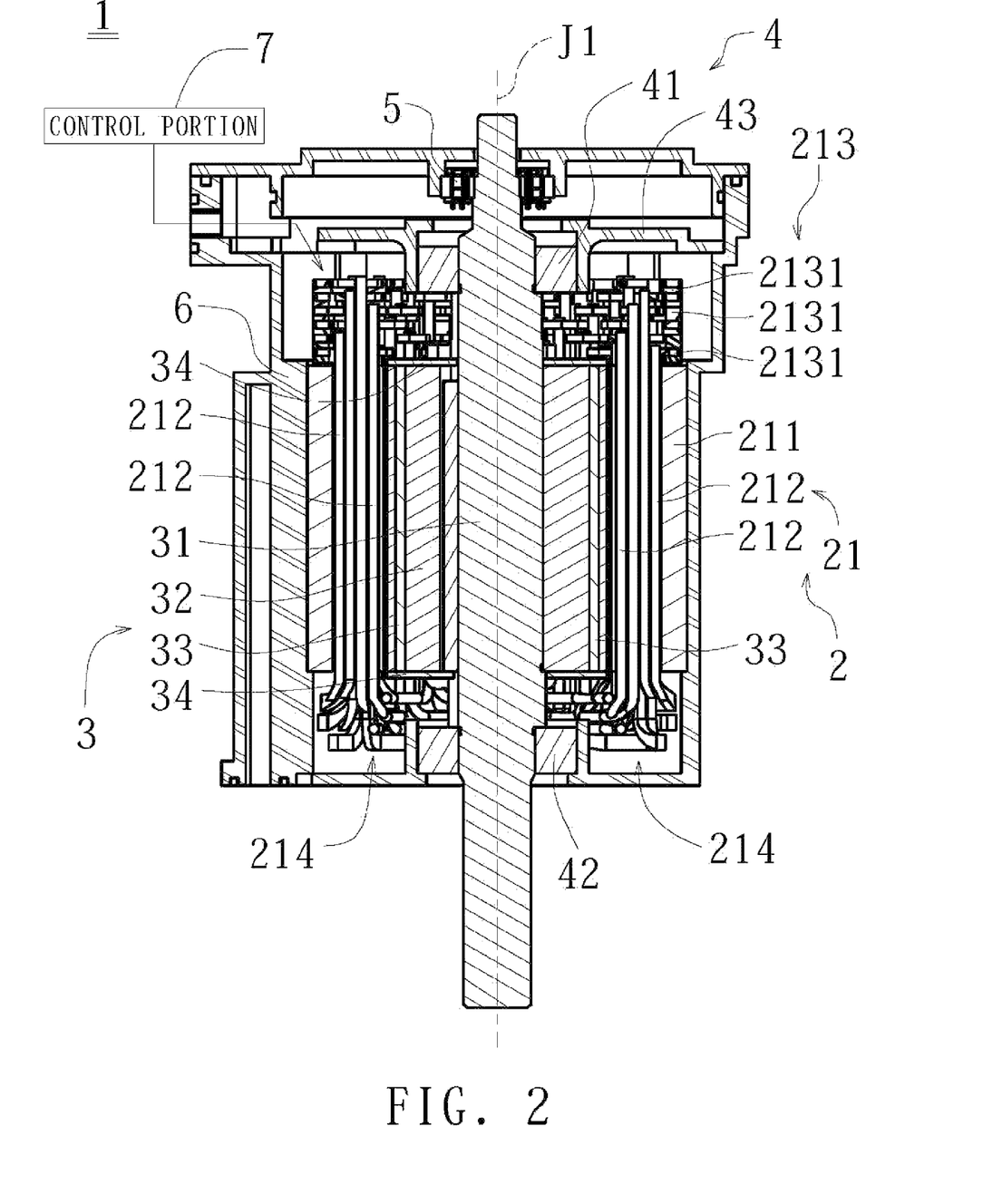
FIG. 2 is a schematic longitudinal sectional view including a central axis shown in FIG. 1.

FIG. 1 is a schematic plan view of a motor 1 according to a first preferred embodiment of the present invention. FIG. 2 is a schematic longitudinal section view of the motor 1.

The motor 1 is a three phase motor which will be used as a compressor for an air conditioner, or the like, in a motor vehicle having an idling stop mechanism (that is, a mechanism for automatically stopping an engine of the vehicle when not in motion). As shown in FIGS. 1 and 2, the motor 1 preferably is configured such that the central axis J1 is approximately twice as long as a radial length.

As shown in FIG. 2, the motor 1 which is an inner rotor type preferably includes a stator portion 2 which is a fixed assembly, a rotor portion 3 which is a rotatable assembly, a bearing mechanism 4 which is arranged at the stator portion 2 and rotatably supports the rotor portion 3 with respect to the stator portion 2 in a concentric manner with the central axis J1, a resolver portion 5 which detects a rotational angle of the rotor portion 3 relative to the stator portion 2, and a housing 6 which accommodates therein the stator portion 2, the rotor portion 3, the bearing mechanism 4 and the resolver portion 5. The housing 6 preferably includes a cylindrical portion for retaining the stator 21 (described below), and a bottom portion for covering a lower side of the stator 21.

Figure 3:
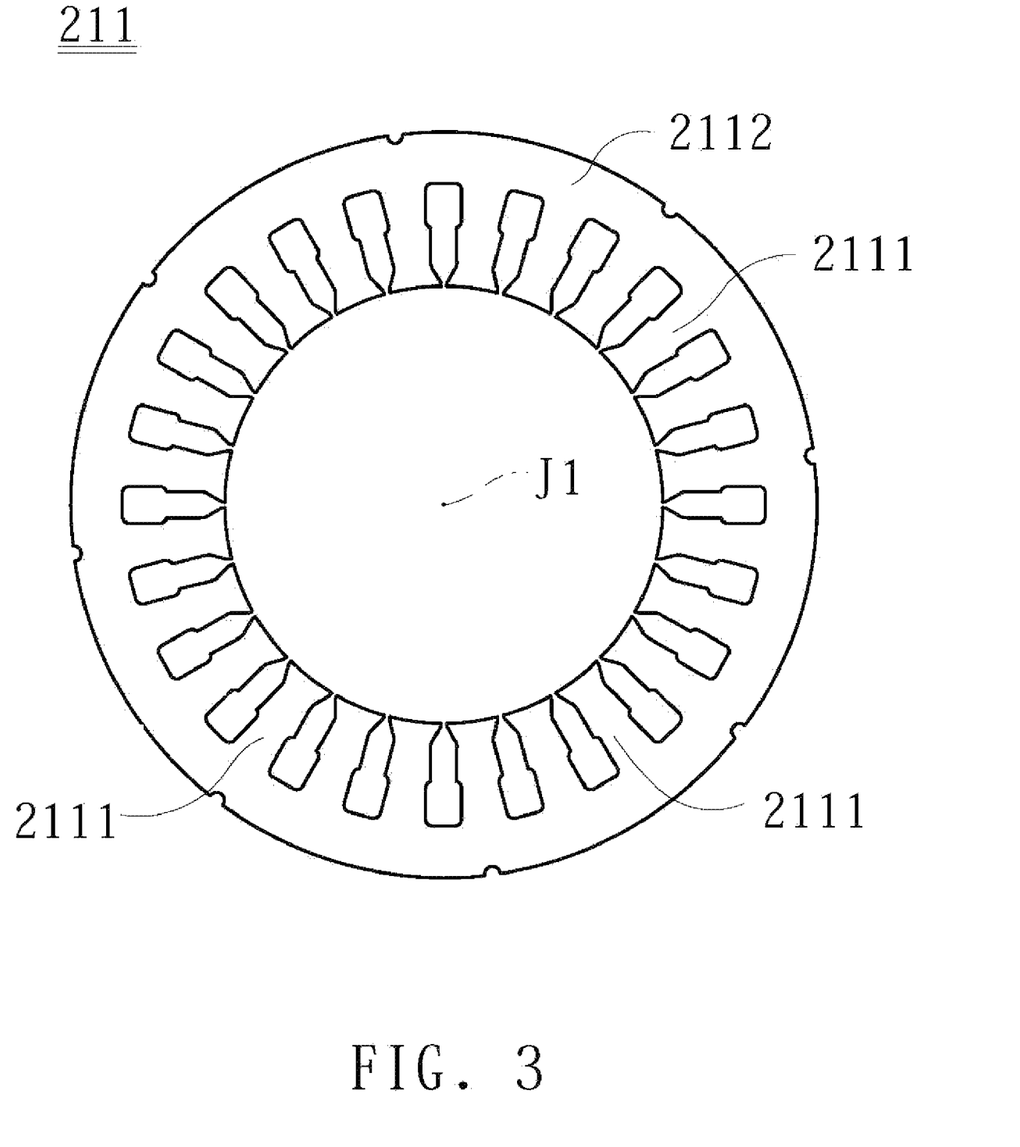
FIG. 3 is a schematic plan view of a stator core of a stator.

The stator portion 2 preferably includes the stator 21 arranged at an inner circumferential surface of the housing 6. The stator 21 preferably includes a stator core 211 which is formed by laminating a plurality of thin silicon steel plates on top of another. FIG. 3 is a schematic plan view of the stator core 211 according to the present preferred embodiment. As shown in FIG. 3, the stator core 211 preferably includes a plurality (for example, 24 in the present preferred embodiment) of teeth 2111 each extending outwardly in the radial direction, and a core back portion 2112 having a substantially annular shape arranged at an end portion of the teeth away from the central axis J1.

Figure 4:
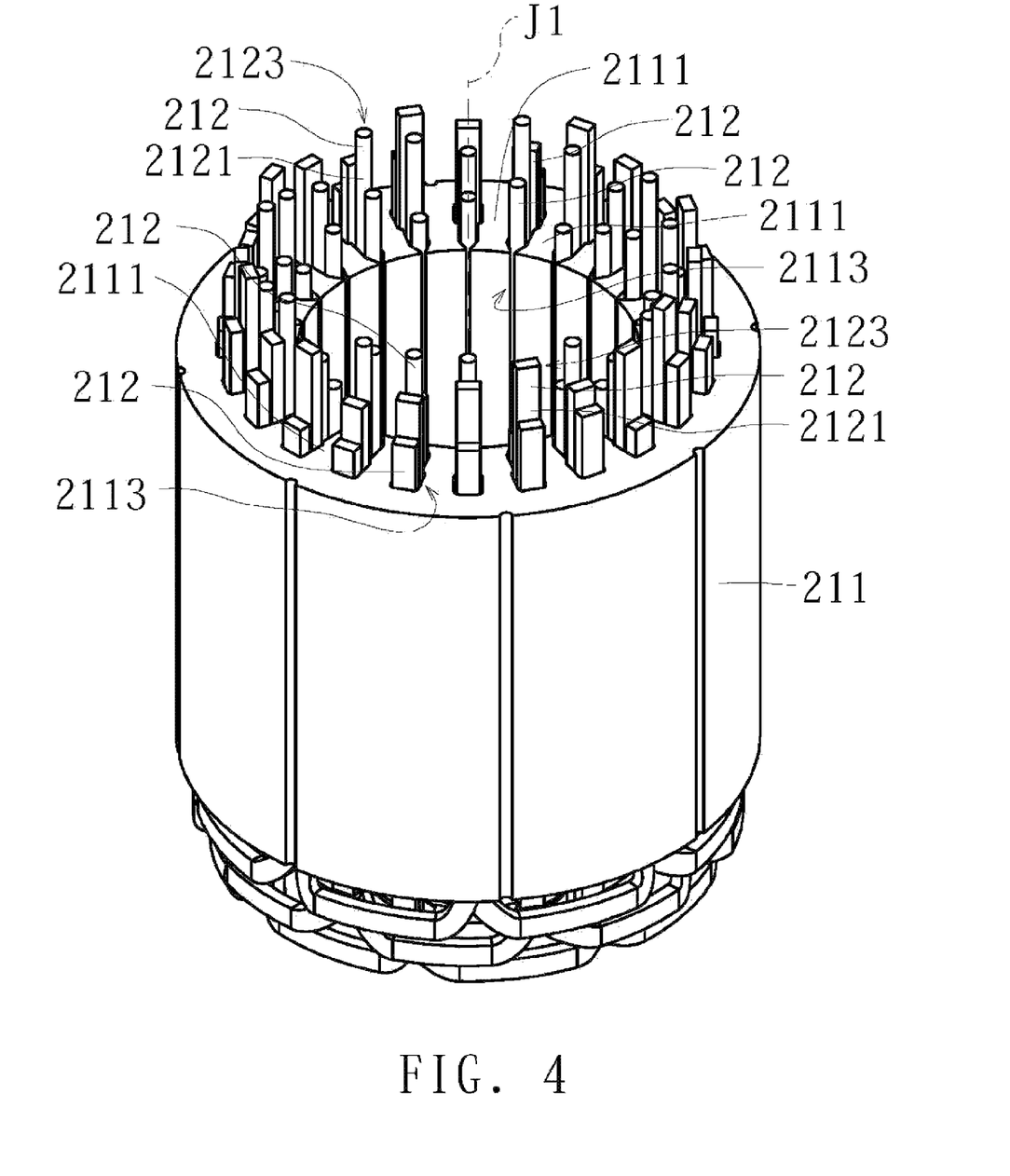
FIG. 4 is a schematic perspective view of a plurality of wires attached to the stator core of the stator.

FIG. 4 is a schematic perspective view of the stator core 211 and a plurality (for example, 48 in the present preferred embodiment) of wires 212 each attached to the stator core 211. As shown in FIG. 4, each wire 212 preferably includes a portion which extends in a parallel or substantially parallel manner with respect to the central axis J1 at a slot 2113 which is defined between each two adjacent teeth 2111 (i.e., in total, the stator core 211 preferably includes 24 of slots 2113, for example).

The rotor portion 3 shown in FIG. 2 preferably includes a shaft 31 concentric with the central axis J1, a rotor core 32 having a substantially cylindrical shape attached to a circumference of the shaft 31 by a method such as pressing, a plurality of field magnets 33 each are thin plate of permanent magnet retained by the rotor core 32, and a rotor cover 34 having a substantially discoid shape arranged to cover both axial ends of the rotor core 32. The rotor core 32 is formed by laminating a plurality of thin magnetic steel plates in the axial direction. An outer circumferential surface of the rotor core 32 is arranged opposite from an inner circumferential surface of the teeth 2111 of the stator 21. Also, the rotor cover 34 is made of a non-magnetic material (e.g., resin, aluminum or the like). The rotor cover 34 is affixed to the rotor core 32 by a bolt or the like. The rotor cover 34 minimizes axial movement of the field magnet 33. According to the motor 1 of the present preferred embodiment, the field magnets 33 are arranged opposite from the stator 21 having an annular shape centered about the central axis J1. When electric current is conducted to the stator 21, a torque centered about the central axis J1 will be generated between the stator 21 and the field magnet 33.

Figure 5A:
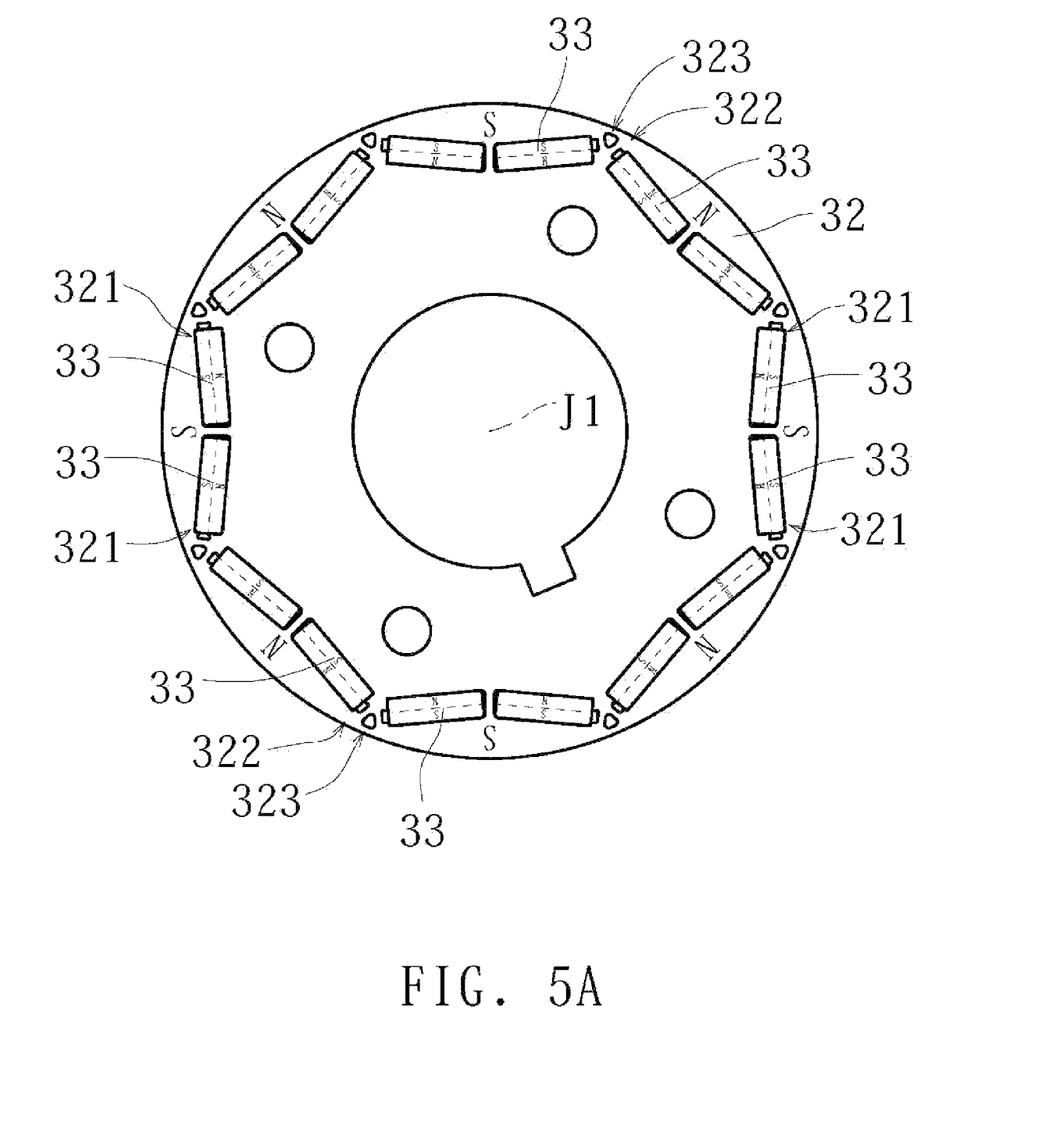
FIG. 5A is a schematic plan view of a rotor core and a field magnet.

FIG. 5A is a schematic plan view of the rotor core 32 and the field magnet 33. As shown in FIG. 5A, the rotor core 32 preferably includes a plurality (for example, 16 in the present preferred embodiment) of magnet retaining holes 321 arranged therethrough in a direction parallel or substantially parallel to the central axis J1. Each magnet retaining hole 321 has inserted therein the field magnet 33. According to the present preferred embodiment, each field magnet 33 inserted into the corresponding magnet retaining hole 321 is divided into four sections in the axial direction. In the description hereafter, each magnet retaining hole 321 which is divided into four sections of the field magnets 33 will be referred to as one field magnet 33.

As shown in FIG. 5A, a number of magnetic poles included in the rotor portion 3 is preferably 8, for example. To be more specific, a pair of field magnets 33 arranged next to one another form one magnetic pole forming an approximately V-shaped configuration with its opening facing away from the central axis J1.

The rotor core 32 of the present preferred embodiment preferably includes a hole portion 323 arranged independently of the magnet retaining hole 321 at a portion of the rotor core 32 between a pair of field magnets 33 of opposite magnetic polarities arranged next to one another. According to the present preferred embodiment, the rotor core 32 preferably includes 8, for example, hole portions 323 each penetrating the rotor core 32 in a direction parallel or substantially parallel with the central axis J1 which are arranged in the circumferential direction evenly apart from one another and relatively apart from the magnet retaining holes 321.

Since the rotor core 32 of the motor 1 includes the hole portion 323 at the portion arranged between the field magnets 33 of opposite magnetic polarities next to one another, the magnetic resistance at the portion 322 is increased. By virtue of such configuration, leakage of magnetic flux at the space between the field magnets 33 of opposite magnetic polarities next to one another is minimized and thereby improving the motor efficiency. That is, the portion at which the hole portion 323 is arranged functions as a flux barrier. Hereinafter, such portion will be referred to as a flux barrier portion 322 and the hole portion 323 will be referred to as a flux barrier hole 323.

Figure 5B:
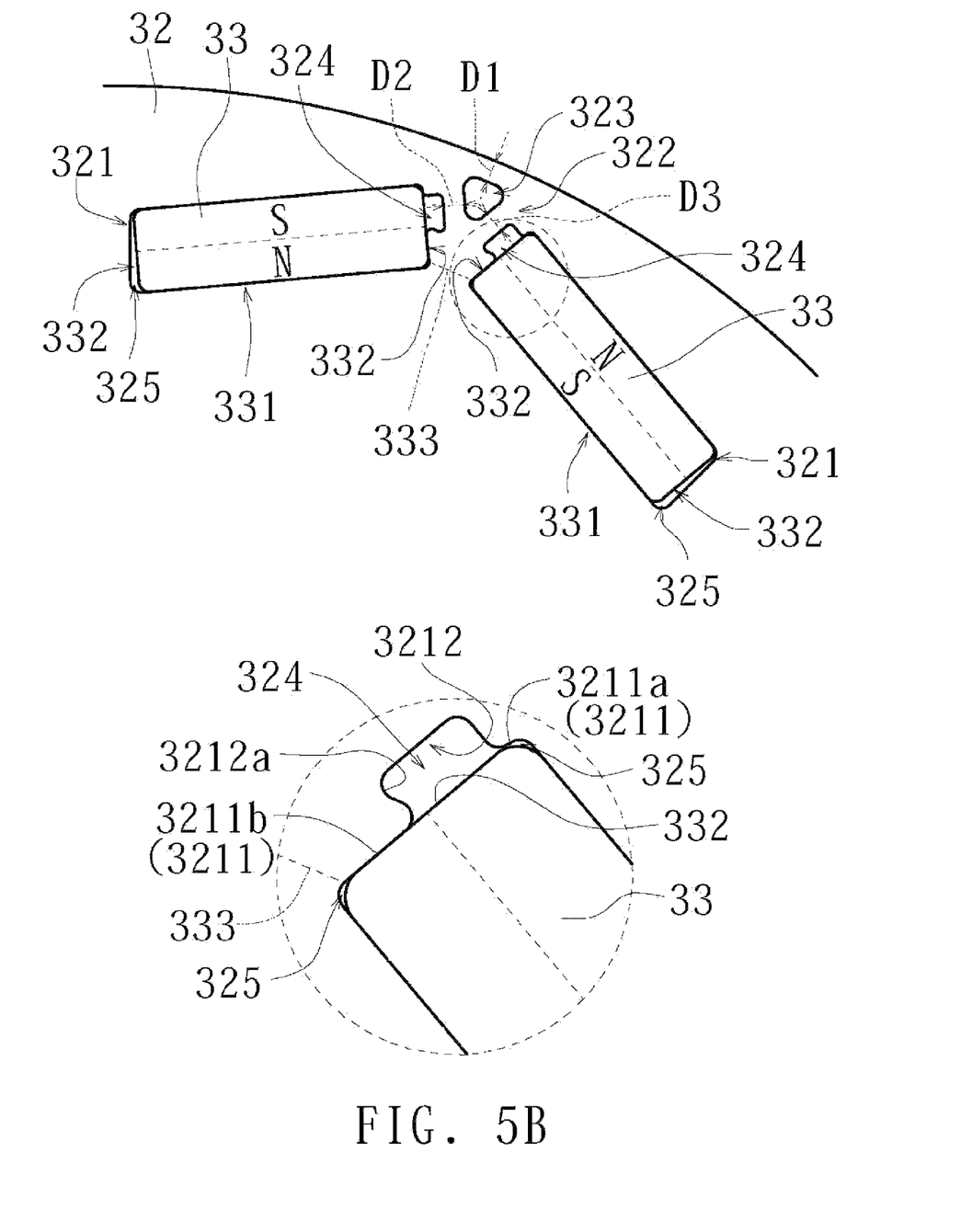
FIG. 5B is a schematic diagram showing an enlarged view of the rotor core surrounding a flux barrier hole.

FIG. 5B is a schematic diagram showing an enlarged view of a portion of the rotor core 32 surrounding the flux barrier hole 323. As shown in FIG. 5B, the flux barrier hole 323 is preferably arranged at a portion at the flux barrier portion 322 defined by a line 333 which is a line connecting a radially inward facing surface of each field magnet of opposite magnetic polarities and a radial end of the rotor core 32. Also, the flux barrier hole 323 whose cross section preferably has a substantially triangular shape preferably penetrates the rotor core 32 in the axial direction.

The magnet retaining hole 321 preferably includes at a side thereof nearer to the flux barrier hole 323 a gap clearance 324. The magnet retaining hole 321 preferably includes at a side thereof facing the flux barrier hole 323 a side portion 3211 which minimizes radial and circumferential movement of the field magnet 33, and a concave portion 3212 which extends toward the flux barrier hole 323. The concave portion 3212 is preferably arranged between a pair of side portions 3211. Note that a side portion 3211 arranged radially outwardly of the concave portion 3212 will be referred to as an outer side portion 3211a and one that is arranged radially inwardly of the concave portion 3212 will be referred to as an inner side portion 3211b. Also note that outer side portion 3211a and the inner side portion 3211b each include a surface that is parallel or substantially parallel with a surface of the flux barrier hole 323 which is parallel with the magnet retaining hole 321.

Also, the concave portion 3212 preferably includes an extended concave portion 3212a which extends radially inwardly from the concave portion 3212. By virtue of such configuration, the flux barrier portion 322 is expanded so as to further minimize leakage of magnetic flux, which improves the motor efficiency.

Also, the magnet retaining hole 321 preferably includes at an end thereof opposite from the gap clearance 324 a gap clearance 325 (i.e., at an end thereof facing anther field magnet 33 of the same magnet polarity). The gap clearance 325 is arranged such that the gap clearance 325 and the inner side surface 3211b of the same magnet retaining hole 321 are not parallel with one another.

Also, the gap clearance 325 preferably includes a portion which makes contact with a portion of the field magnet 33. By virtue of such configuration, radial and circumferential movement of the field magnet 33 is minimized.

The substantially triangular shape of the cross section of the flux barrier hole 323 preferably includes a side which extends in an approximately parallel direction with the outer circumferential and a pair of sides each extend in an approximately parallel manner with the side surface 332 of the field magnet 33 facing the corresponding flux barrier hole 323. Note that, as shown in FIG. 5B, D2 and D3 which are the shortest distances between the magnet retaining hole 321 and the flux barrier hole 323 which are opposite to one another are equal to one another.

The bearing mechanism 4 preferably includes, as shown in FIG. 2, an upper bearing 41 and a lower bearing 42 which are attached respectively at an upper portion and a lower portion of the rotor core 32 to the shaft 31, and a bearing holder 43 which is affixed to the housing 6 and in which the upper bearing 41 is accommodated. The lower bearing 42 is accommodated in an accommodation portion arranged at a bottom central portion of the housing 6 having a substantially cylindrical side wall.

As described above, according to the rotor portion 3 of the motor 1 of the present preferred embodiment of the present invention, the flux barrier hole 323 is arranged at the flux barrier portion 322 of the rotor core 32 so as to increase the magnetic resistance thereof, and thereby minimizing leakage of magnetic flux at the space between the field magnets 33 of the opposite magnetic polarities next to one another and improving the efficiency of the motor. Also, since the magnet retaining hole 321 includes the gap clearance 324 extending toward the corresponding flux barrier hole 323, leakage of magnetic flux at the space between the field magnets 33 of opposite magnetic polarities next to one another is minimized further improving the efficiency of the motor.

According to the rotor portion 3 of the present preferred embodiment, since the flux barrier hole 323 is arranged independently of the corresponding pair of the magnet retaining holes 321, durability of the rotor core 32 particularly near the portion surrounding the flux barrier hole 323 is uncompromised. Also, since the magnet retaining hole 321 includes the gap clearance 324, the dimension of the flux barrier hole 323 is kept at a minimum and therefore, durability of the flux barrier portion 322 is uncompromised. By virtue of such configuration, the flux barrier portion 322 is operable to support the centrifugal force applied to the field magnet 33 while the rotor portion 3 is in motion improving the reliability of the motor 1.

Since a motor used as a compressor in an air conditioner or the like in a motor vehicle or the like is expected to run efficiently and reliably, the motor 1 according to the present preferred embodiment of the present invention as described above in which durability of the rotor core 32 is uncompromised and the efficiency thereof is improved is particularly suitable for such use.

According to the rotor portion 3 of the present preferred embodiment of the present invention, since each flux barrier hole 323 uniformly penetrates the rotor core 32 at the same cross sectional portion thereof, magnetic resistance is evenly increased. Therefore, the efficiency of the motor 1 is improved. Also, since each magnet retaining hole 321 includes at the side thereof opposite from the corresponding flux barrier hole 323 the gap clearance 325, leakage of magnetic flux at a portion between two field magnets 33 of the same magnetic polarity is effectively minimized further improving the efficiency of the motor 1.

By virtue of such configuration of the rotor portion 3 in which a pair of field magnets 33 arranged next to one another collectively form a magnetic pole while each field magnet 33 is accommodated in its own independent magnet retaining hole 321, the centrifugal force applied to each field magnet 33 while the rotor portion 3 is in motion is minimized and a load imposed on each flux barrier portion 322 of the rotor core 32 is reduced. That is, the flux barrier portion 322 is more durable against the centrifugal force applied thereto which consequently increases relative durability of the rotor core 32.

According to the rotor portion 3 of the present preferred embodiment of the present invention, as shown in FIG. 5B, D1 which is a distance between the flux barrier hole 323 and the outer circumferential end of the rotor core 32, D2 and D3 which are minimum distances between the flux barrier hole 323 and the corresponding portion of the magnet retaining hole 321 are equal to one another. By virtue of such configuration, an area of the flux barrier hole 323 is maintained while reducing stress concentration at the flux barrier portion 322 while the rotor portion 3 is in motion, and therefore, durability of the rotor core 32 is improved which improves the efficiency of the motor 1.

Figure 6:
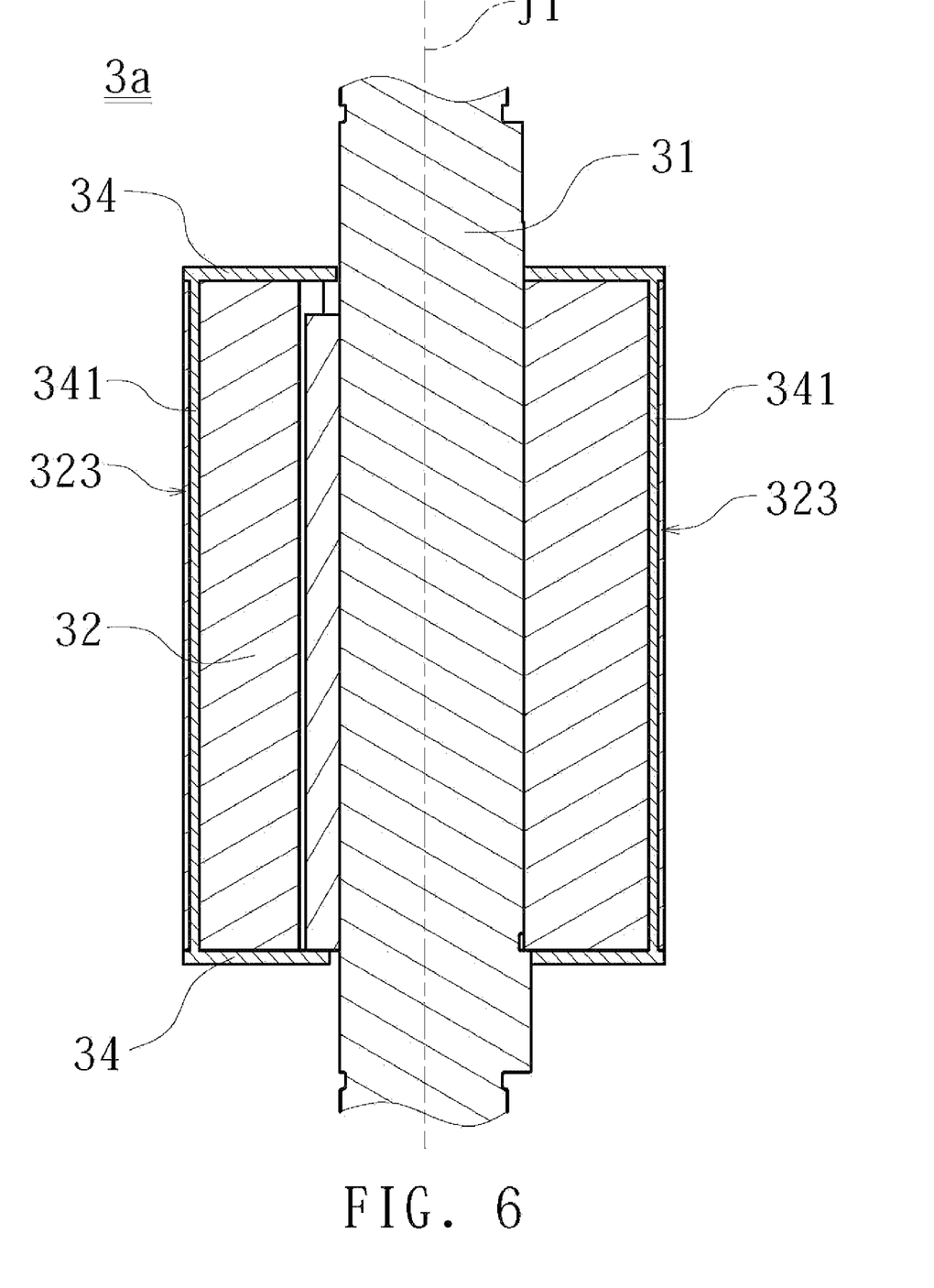
FIG. 6 is a schematic longitudinal section view of a rotor portion of a motor according to a second preferred embodiment of the present invention.
Figure 7:
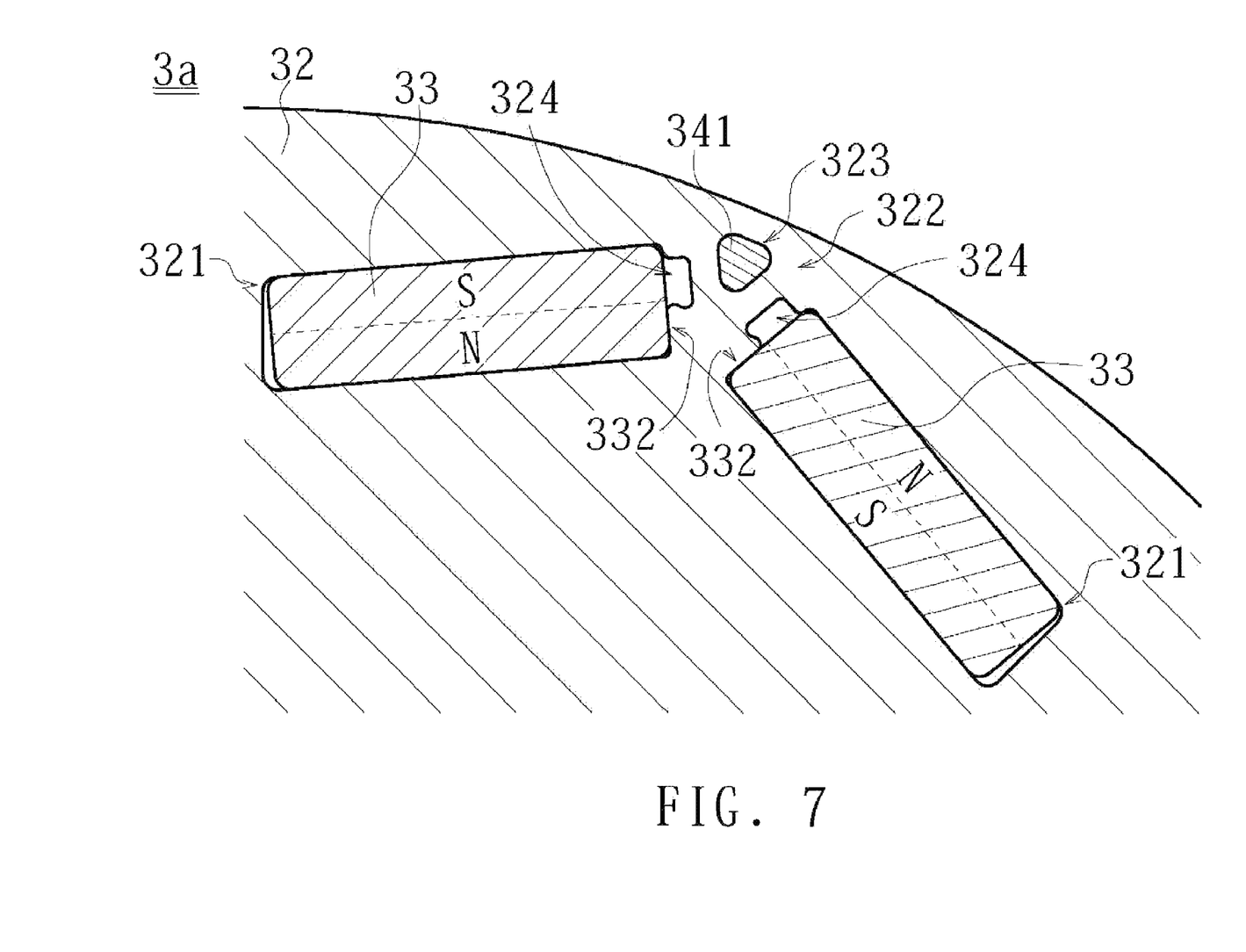
FIG. 7 is a schematic cross sectional view showing a surface perpendicular to the central axis of the rotor portion shown in FIG. 6.

Hereinafter, a motor according to a second preferred embodiment of the present invention will be described. FIG. 6 is a schematic longitudinal sectional view of a rotor portion 3a of the motor according to the second preferred embodiment. FIG. 7 is a schematic cross sectional view showing a surface that is perpendicular or substantially perpendicular to the central axis of the rotor portion 3a.

As shown in FIGS. 6 and 7, the rotor portion 3a preferably includes at each flux barrier hole 323, a reinforcement portion 341 made of a material (i.e., preferably non magnetic material such as resin) having a lower magnetic permeability than that of the rotor core 32. Note that in the description of the second preferred embodiment of the present invention hereafter, elements similar to those illustrated in FIGS. 1 through 5A are denoted by similar reference numerals, and description thereof is omitted.

As shown in FIG. 6, the rotor portion 3a preferably includes a pair of the rotor covers 34 which cover both axial ends of the field magnets 33, and are made of the same material as the reinforcement portion 341. Also, the rotor covers 34 are preferably made integral with the reinforcement portion 341 by insert molding. By virtue of such configuration, the flux barrier hole 323 is substantially filled by a portion of the rotor cover 34.

As shown in FIG. 7, the rotor core 32 of the rotor portion 3a preferably includes, as in the first preferred embodiment of the present invention, at the flux barrier portion 322, the flux barrier hole 323 independently of the magnet retaining hole 321. Also, since the magnet retaining hole 321 includes the gap clearance 324, the dimension of the flux barrier hole 323 is kept at minimum and therefore, durability of the flux barrier portion 322 is uncompromised. By virtue of such configuration, leakage of magnetic flux at the space between the field magnets 33 of opposite magnetic polarities next to one another is minimized further improving the efficiency of the motor.

According to the rotor portion 3a of the present preferred embodiment of the present invention, since the flux barrier hole 323 includes the reinforcement portion 341, durability of the flux barrier portion 322 is further improved. Also, since the plurality of reinforcement portions 341 and the rotor covers 34 are integrally formed, the manufacturing of the rotor portion 3a and the motor is simplified.

While the present invention has been described in detail, the forgoing description is in all aspects illustrative and not restrictive. It is understood that numerous modifications and variations can be devised without departing from the scope of the invention.

For example, according to the motor of the second preferred embodiment, the bolt may not be needed to affix the rotor cover 34 to the rotor core 32 if the rotor cover 34 is secured to the rotor cover 34 via a plurality of reinforcement portions 341. Also, the reinforcement portion 341 may be used as a balancer for the rotor portion 3a.

Also, although the preferred embodiments of the present invention described above assume that the cross section of the flux barrier hole 323 preferably has a substantially triangular shape, the present invention is not limited thereto. Also, although the preferred embodiments assume that the rotor core 32 includes only one flux barrier hole 323, the present invention is not limited thereto.

Although the preferred embodiments of the present invention described above assume that the flux barrier hole 323 penetrates the rotor core 32, the present invention is not limited thereto.

Although the preferred embodiments of the present invention described above assume that the rotor portion includes a pair of the field magnets 33 having the same magnetic polarity arranged next to one another, the present invention is not limited thereto. The rotor portion may include field magnets of opposite magnetic polarities may be arranged next to one another. Also, the present invention may include more than three of field magnets 33 of the same magnetic polarity may be arranged next to one another.

Note that the field magnet 33 may be a thin plate having a curved shape or a cylindrical shape extending in the axial direction. Also, the present invention may be used as a power source for a hybrid motor vehicle or the like.

While preferred embodiments of the present invention have been described above, it is to be understood that variations and modifications will be apparent to those skilled in the art without departing the scope and spirit of the present invention. The scope of the present invention, therefore, is to be determined solely by the following claims.

What is claimed is:

1. A motor comprising:
    a rotor portion rotating about a central axis and including:
        a shaft arranged concentrically with the central axis;
        a rotor core having a substantially cylindrical shape attached to the shaft; and
        a plurality of field magnets arranged at an outer circumferential surface of the rotor core facing the central axis, and each of the plurality of field magnets extending in a direction that is substantially parallel to the central axis; wherein
    the rotor core includes:
        a plurality of magnet retaining holes accommodating therein the plurality of field magnets; and
        a plurality of flux barrier holes arranged in the direction that is substantially parallel to the central axis at a space between a corresponding pair of the plurality of field magnets, one magnet in the corresponding pair of the plurality of field magnets having a magnetic polarity different from another magnet in the corresponding pair of the plurality of field magnets; wherein
    each of the plurality of flux barrier holes is independent of a corresponding pair of the plurality of magnet retaining holes;
    each of the plurality of magnet retaining holes includes a concave portion extending toward a corresponding flux barrier hole; and
    each of the plurality of magnet retaining holes includes at a side thereof facing the corresponding flux barrier hole a pair of side portions spaced apart from one another, and each of the plurality of magnet retaining holes includes the concave portion at a portion radially between the pair of side portions.

2. The motor according to claim 1, wherein a shortest distance between each of the corresponding pair of the plurality of magnet retaining holes and the corresponding flux barrier hole arranged therebetween are equal to one another.

3. The motor according to claim 2, wherein the shortest distance between each of the corresponding pair of the plurality of magnet retaining holes and the corresponding flux barrier hole arranged therebetween and a shortest distance between the corresponding flux barrier hole and an edge of the rotor core are equal.

4. The motor according to claim 1, wherein the corresponding flux barrier hole includes a side substantially parallel with an outer circumferential edge of the rotor core, and a pair of sides each being substantially parallel with a side of each of the corresponding pair of the plurality of magnet retaining hole facing thereto.

5. The motor according to claim 3, wherein the corresponding flux barrier hole has a substantially triangular shape.

6. The motor according to claim 5, wherein the concave portion includes an extended concave portion extending in a direction connecting the corresponding pair of the plurality of field magnets and arranged adjacent to the corresponding flux barrier hole.

7. The motor according to claim 5, wherein the concave portion includes a surface that is substantially parallel with a side of the corresponding flux barrier hole.

8. The motor according to claim 1, wherein a magnetic pole is defined by a pair of the plurality of field magnets between flux barrier holes arranged circumferentially next to one another.

9. The motor according to claim 8, wherein the pair of the plurality of field magnets collectively defining a magnetic pole are spaced apart from one another in a circumferential direction.

10. The motor according to claim 3, wherein the corresponding flux barrier hole has a uniform shape in an axial direction.

11. The motor according to claim 1, wherein the rotor portion includes at the corresponding flux barrier hole a reinforcement portion having a lower magnetic permeability than that of the rotor core.

12. The motor according to claim 11, wherein the rotor portion includes a rotor cover of non-magnetic substance arranged at both axial end surfaces of the rotor core covering the plurality of field magnets, a portion of the rotor cover is filled in the plurality of flux barrier holes.

13. The motor according to claim 12, wherein the rotor cover is made of a solidified fused material.

14. A motor comprising:
    a rotor portion rotating about a central axis and including:
        a shaft arranged concentrically with the central axis;
        a rotor core having a substantially cylindrical shape attached to the shaft; and
        a plurality of field magnets arranged at an outer circumferential surface of the rotor core facing the central axis, and each of the plurality of field magnets extending in a direction that is substantially parallel to the central axis; wherein
    the rotor core includes:
        a plurality of magnet retaining holes accommodating therein the plurality of field magnets; and
        a plurality of flux barrier holes arranged in the direction that is substantially parallel to the central axis at a space between a corresponding pair of the plurality of field magnets, each corresponding pair of the plurality of field magnets having a magnetic polarity different from each adjacent pair of the plurality of field magnets; wherein
    each of the plurality of flux barrier holes is independent of a corresponding pair of the plurality of magnet retaining holes;
    each of the plurality of magnet retaining holes includes a concave portion extending toward a corresponding flux barrier hole; and
    each of the plurality of magnet retaining holes includes a gap clearance arranged to provide a space between the field magnet accommodated therein, at a side thereof circumferentially opposite from the concave portion.

15. The motor according to claim 14, wherein
- the corresponding flux barrier hole is arranged radially outward from an imaginary line that extends in a circumferential direction between adjacent radially inward surfaces of the corresponding pair of the plurality of field magnets; and
- there are no other magnets arranged between the corresponding pair of the plurality of field magnets.

16. The motor according to claim 14, wherein the corresponding flux barrier hole has a uniform shape in an axial direction.

17. The motor according to claim 14, wherein a magnetic pole includes a pair of the plurality of field magnets between flux barrier holes arranged circumferentially next to one another.

18. The motor according to claim 14, wherein a shortest distance between each of the corresponding pair of the plurality of magnet retaining holes and the corresponding flux barrier hole arranged therebetween are equal to one another.

19. The motor according to claim 18, wherein the shortest distance between each of the corresponding pair of the plurality of magnet retaining holes and the corresponding flux barrier hole arranged therebetween and a shortest distance between the corresponding flux barrier hole and an edge of the rotor core are equal.

20. The motor according to claim 19, wherein the corresponding flux barrier hole has a substantially triangular shape.

* * * * *